United States Patent
Masaoka et al.

[11] 3,830,551
[45] Aug. 20, 1974

[54] ENDLESS TRACK BELT FOR A SMALL TRACK-LAYING VEHICLE

[75] Inventors: Yutaka Masaoka, Hamakita; Masao Nakai, Shizuka-ken, both of Japan

[73] Assignee: Yamaha Hatsudoki Kabushiki Kaisha, Iwata-shi, Shizuoka-ken, Japan

[22] Filed: Aug. 29, 1973

[21] Appl. No.: 392,673

[52] U.S. Cl.............. 305/35 R, 305/35 EB, 305/39
[51] Int. Cl............................................. B62d 55/26
[58] Field of Search.......... 305/35 R, 39, 35 EB, 46, 305/53

[56] References Cited
UNITED STATES PATENTS

| | | |
|---|---|---|
| 3,136,378 | 6/1964 | Patee ........................ 305/35 EB X |
| 3,762,779 | 10/1973 | Russ.............................. 305/35 EB |

FOREIGN PATENTS OR APPLICATIONS

| | | |
|---|---|---|
| 256,796 | 8/1926 | Great Britain.................. 305/35 EB |

*Primary Examiner*—Robert S. Ward, Jr.

[57] ABSTRACT

An endless track belt for a small track-laying vehicle having a plurality of primary transverse ribs, wherein said primary ribs have the backside so shaped as to prevent earth or snow from being scattered rearward when said ribs leave the surface of the ground or snow, and are further provided on said backside with a plurality of very small, narrow secondary ribs extending along the length of said backside.

8 Claims, 10 Drawing Figures

ENDLESS TRACK BELT FOR A SMALL TRACK-LAYING VEHICLE

BACKGROUND OF THE INVENTION

This invention relates to improvements on an endless track belt for a small track-laying vehicle, particularly, a small snowmobile. The prior art endless track belt for a small snowmobile has a plurality of sharp-edged ribs formed on the outer surface so as to cut deep into, for example, the snow. However, the sharp-edged ribs tend to dig up the snow adjacent to the backside of the ribs when they leave the snow surface along the periphery of the rear sprocket wheel. This event undesirably gives rise to a prominent resistance to traction, or the torque loss of the sprocket wheel and moreover causes lump of snow to be forcefully thrown against the rear part of the snowmobile or a following vehicle with the possible damage thereof.

SUMMARY OF THE INVENTION

This invention provides an endless track belt whose ribs are prevented from taking the above-mentioned digging action, thereby attaining the efficient traction of a track-laying vehicle.

DESCRIPTION OF THE PREFERRED EMBODIMENTS

Figure 1:
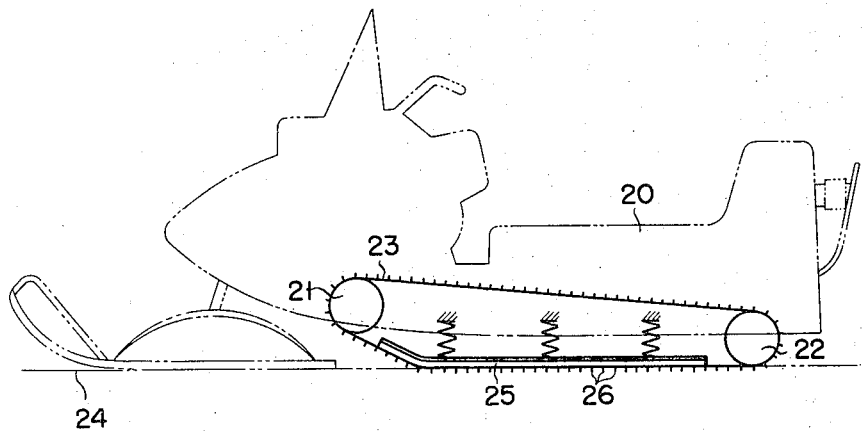
FIG. 1 is a schematic outline of the entire structure of a general snowmobile.

A small snowmobile generally consists, as shown in FIG. 1, of a body 20 fitted with front and rear sprocket wheels 21 and 22. Stretched across the sprocket wheels 21 and 22 is an endless track belt 23 consisting of elastomeric material reinforced with, for example, cloth embedded therein. The endless track belt is driven by the front sprocket wheel 21 connected by an engine (not shown). That part of the endless track belt 23 which contacts the snow surface 24 is supported and guided by a plurality of slide bars 25 (only one indicated) prestressed by elastic support members. The slide bars 25 may be replaced by idler wheels. Formed on the outer surface of the endless track belt 23 are a plurality of ribs 26 arranged parallel to each other at a prescribed space transversely of the endless track belt 23. The ribs successively cut into the snow surface 24 to propel the snowmobile.

Figure 2:
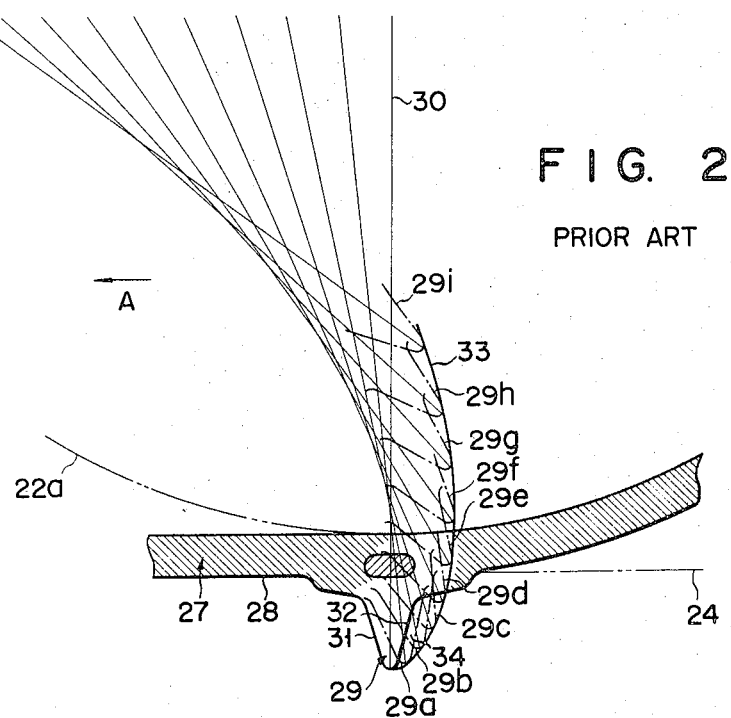
FIG. 2 is a cross sectional view of a locus traced by one of the ribs of the prior art endless track belt of a snowmobile when it leaves the snow surface along the periphery of the rear sprocket wheel.

For better understanding of this invention, description is first given of the prior art endless belt 27 of FIG. 2. The endless belt 27 is stretched over the rear sprocket wheel 22a and has its outer surface 28 provided with a plurality of ribs 29 (only one indicated) having a sharp edge of about 30°. The rib 29 is made symmetrical with respect to the normal 30 of the outer surface 28 of the endless track belt 27. The front and backsides 31 and 32 of the rib 29 are inclined as sharply as about 75° relative to the outer surface of the endless track belt 27. When leaving the snow surface 24 along the periphery of the rear sprocket wheel 22a as the snowmobile moves in the direction of the indicated arrow A, the rib 29 continuously takes different positions in the order or outlines 29a, 29b, 29c ... . A locus traced at this time by the outline of the rib 29, namely, an envelope 33 presents a curve approximating an epitrochoid. Accordingly, the snow present in a region 34 defined between the backside 32 of the rib 29 and the envelope 33 is dug up and thrown upward by the backside 32 of the rib 29 when it leaves the snow surface 24. The digging action of the rib 29 leads to the torque loss of the sprocket wheel and moreover causes lumps of snow to be forcefully thrown against the rear part of the snowmobile or a following vehicle. It will be understood, therefore, that to prevent the digging action, the rib should advisably have its backside so shaped as to minimize the above-mentioned region 34. The rib 35 of FIG. 3 has its backside 36 shaped substantially equal to the envelope 33 of FIG. 2. As apparent from FIG. 3, the envelope 37 drawn by the rib 35 and the backside 36 of the rib 35 jointly define a far smaller region 38 than the region 34 of FIG. 2. Accordingly, the rib 35 whose backside is shaped like the envelope 33 prominently suppresses the objectionable digging action of the rib 35, which might otherwise take place. Further, a rib which has the backside shaped like the envelope 37 can more efficiently reduce said digging action.

Figure 3:
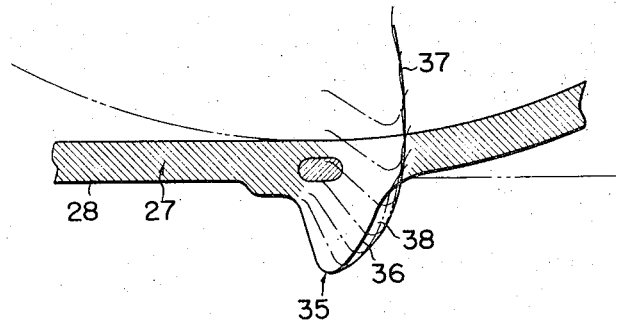
FIG. 3 presents the locus of a rib whose backside is shaped like the locus of FIG. 2.
Figure 4:
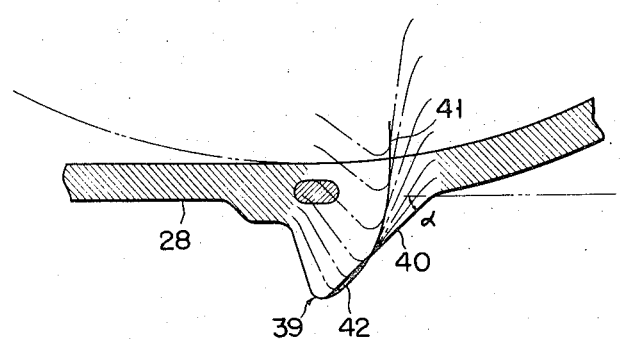
FIG. 4 indicates the locus of a rib whose backside is inclined at a relatively small angle with respect to the outer surface of the endless track belt.

The rib 39 of FIG. 4 has a flat backside 40 inclined at a relatively small angle $\alpha$ of 30° to 50° with respect to the outer surface 28 of the endless track belt. A region 42 defined by the envelope 41 drawn by the rib 39 and its backside 40 is rendered extremely narrow as in FIG. 3.

A rib whose backside is so shaped as to reduce a region defined by the backside dipped in the snow and the envelope drawn by the rib when leaving the snow surface digs up little snow to minimize the loss of a torque moment in a snowmobile and further prevents snow from being thrown upward.

Figure 5:
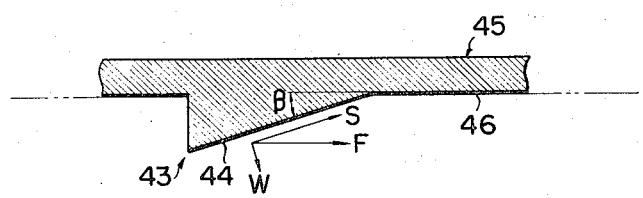
FIG. 5 schematically illustrates the relationship of the inclination of the backside of the rib and its sliding motion.

Nevertheless, the rib 35 or 39 of FIG. 3 or 4 whose backside 36 or 40 is shaped as mentioned above cuts into the snow at a slight angle and is likely to slip over the snow surface. FIG. 5 is a simple exaggerated illustration given for better understanding of the occurrence of the aforesaid difficulties. The backside 44 of a rib 43 is inclined at a small angle $\beta$ with respect to the outer surface 46 of an endless track belt 45. In this case, a driving force F applied by a sprocket wheel (not shown) parallel to the outer surface 46 of an endless belt, namely, the snow surface may be considered to consist of a component S acting parallel to the backside 44 of the rib and a component W acting at right angles to said backside 44. Where the angle $\beta$ of inclination is small, then the component S, namely, a force causing the rib to slip over the snow surface grows extremely large, whereas the component W becomes very small, with the result that the rib is ready to slip in the direction in which the component S acts, resulting in the heavy loss of the driving force of the sprocket wheel.

An endless track belt according to this invention has primary ribs whose backsides are further provided with a plurality of small, narrow secondary ribs in order to eliminate the above-mentioned slip over the snow surface.

There will now be described by reference to FIGS. 6 to 10 some embodiments of this invention.

Figure 6:
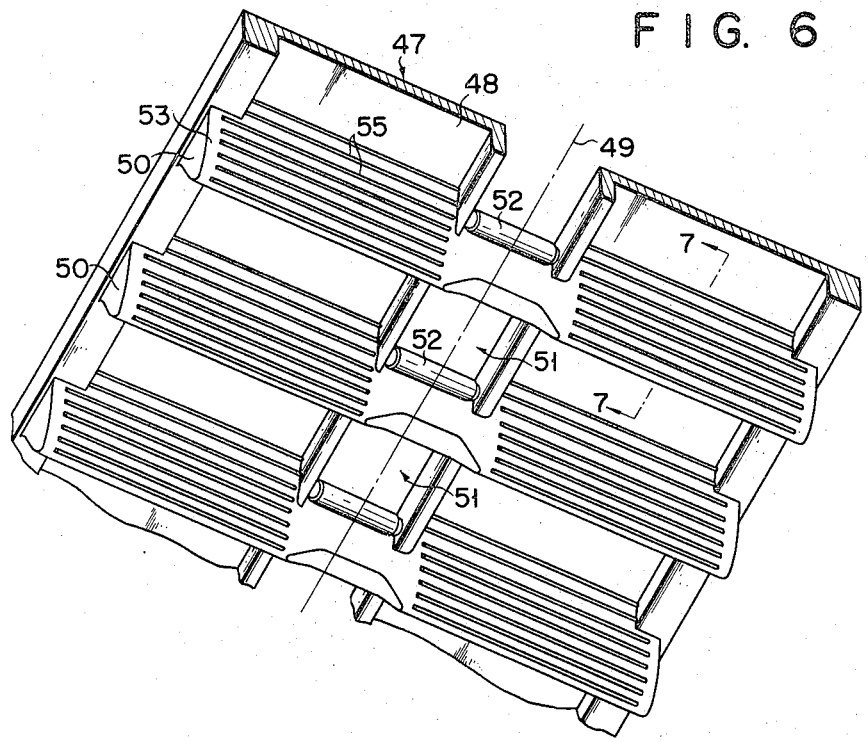
FIG. 6 is a fractional oblique view of an endless track belt for a small track-laying vehicle according to an embodiment of this invention.
Figure 7:
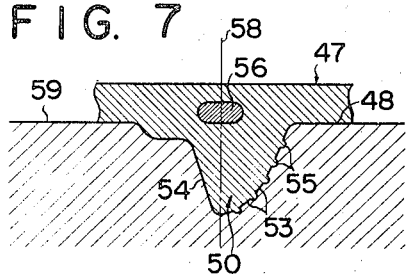
FIG. 7 is a cross sectional view on line 7—7 of FIG. 6.

FIGS. 6 and 7 denote an endless track belt according to a first embodiment of this invention. An endless track belt 47 consists of elastomeric material such as rubber or synthetic resin reinforced with, for example, cloth embedded therein. A plurality of primary ribs 50 are formed on that side 48 of the endless track belt 47 which contacts the surface of the ground or snow when a snowmobile is driven. These primary ribs 50 are arranged parallel to each other at a prescribed space transversely of the longitudinal axis 49 of the endless track belt. Provided along the axis 49 between the adjacent ones of the parallel arranged primary ribs 50 are a plurality of openings 51 which positively engage the teeth of the sprocket wheels (not shown). That part of the primary rib 50 which is positioned between the adjacent openings 51 is fitted with a metal member 52 to be prevented from being damaged by the above-mentioned engagement.

As best shown in FIG. 7, the backside 53 of the primary rib 50 as viewed from the traveling direction of a snowmobile is so shaped as that of the rib 35 shown in FIG. 3. Thus the backside 53 is curved like the envelope drawn by the primary rib when it leaves the snow surface. The root portion of said backside 53 has a gently inward curved plane relative to the outer surface 48 of the endless track belt 47 so as to increase the mechanical strength thereof. On the other hand, the front side 54 of the primary rib 50 as viewed from the running direction of the snowmobile is sharply inclined at an angle of, for example, about 75° relative to the outer surface 48 of the endless track belt 47, but has its root portion properly raised for reinforcement.

Further, the backside 53 of the primary rib 50 is integrally provided with a plurality of small, narrow secondary ribs 55 extending along the substantially full length of the primary rib 50 and arranged parallel to each other at a prescribed space transversely of the axis 49 (FIGS. 6 and 7). The secondary ribs 55 have a semicircular cross section and such a size as prevents the backside 53 of the primary rib 50 from presenting a noticeably changed outline. The secondary rib 55 has a height equal to about 1/10 to 1/30 of a distance from the outer surface 46 of the endless track belt to the edge of the primary rib 50. The base of the secondary rib 55 has a width equal to about 1/8 to 1/20 of that of the primary rib 50. Further, the secondary ribs 55 are spaced from each other at an interval 2 or 3 times their width.

The primary rib 50 which has its backside shaped like the aforesaid envelope and provided with a plurality of small, narrow secondary ribs having the above-mentioned size and arrangement is properly prevented from taking the action of digging up snow and also saved from a slip over the snow surface.

As seen from FIG. 7, there is provided below the primary rib 50 a reinforcing metal member 56 extending along the length of said rib 50. This reinforcing metal member 56 serves to prevent the endless track belt 47 from being bent transversely.

Figure 8:
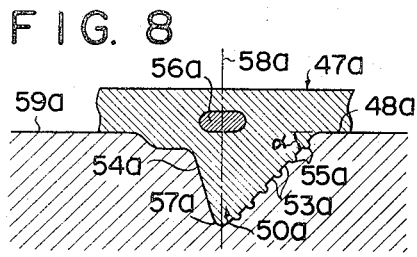

The primary rib 50a of the endless track belt 47a according to the second embodiment of FIG. 8 is of the same type as that of FIG. 7 excepting that the backside 53a of said primary rib 50a is formed with a flat surface and inclined at an angle of 30° to 50° to the outer surface 48a of the endless track belt 47a. The primary rib 50a of FIG. 8 has its top portion 57a made sharper than that of the first embodiment of FIGS. 6 and 7 and better cuts into the snow surface. Further, the relatively simple outline of the backside 53a facilitates the fabrication of a mould for shaping the endless track belt with the primary ribs 50a.

Figure 9:
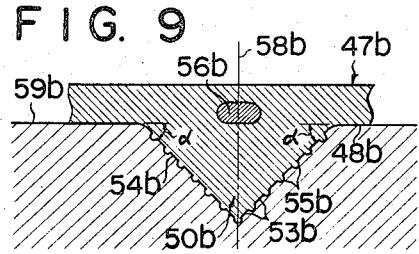
FIGS. 8, 9 and 10 are similar cross sectional views of endless track belt ribs according to the other embodiments of the invention.

The primary rib 50b of the endless track belt 47b according to the third embodiment of FIG. 9 has its backside 53b shaped like that of FIG. 8 and its front side 54b made symmetrical with the backside 53b relative to a normal 58b vertical to the outer surface 48b of the endless track belt 47b. The primary rib 50b according to the third embodiment of FIG. 9 is prevented from digging up snow and also saved from a slip over the snow in not only the forward but also the backward travel of a snowmobile.

Figure 10:
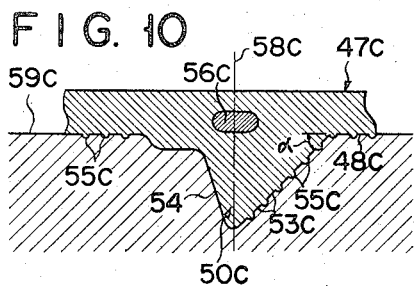

The fourth embodiment of FIG. 10 is the same as that of FIG. 8 excepting that the endless track belt 47c itself has its outer surface 48c provided with a plurality of the aforesaid secondary ribs 55c. This arrangement enables a snowmobile to have a larger frictional force against the snow surface 59c, effectively preventing the slip of the endless track belt 48c over the snow surface.

Throughout the foregoing embodiments, the secondary ribs 55, 55a, 55b and 55c have a semicircular cross section. However, the secondary ribs may have different cross sectional shapes, sizes and arrangements depending on the shape, measurements and function of a snowmobile. For example, the secondary rib may have a sharp or relatively plane cross section as occasion demands.

Similarly are effective secondary ribs not disposed parallel to the longitudinal axis of the primary rib but inclined thereto at a prescribed angle or another type of secondary ribs inclined to said longitudinal axis at more than two angles so as to present a meshlike pattern.

It is also possible to provide on the backside of the primary rib a plurality of parallel rows of secondary ribs shorter than the longitudinal length of the primary rib or a plurality of projections having a columnar, conical, frustum (trancated conical) or semispherical shape.

What we claim is:

1. An endless track belt for a small track-laying vehicle stretched across at least two sprocket wheels positioned near both ends of the track-laying vehicle and provided on the outer surface with a plurality of primary ribs arranged parallel to each other at a prescribed space transversely of the endless track belt, wherein the backside of the primary rib as viewed from the traveling direction of the track-laying vehicle when said rib contacts the ground has a shape to reduce substantially to zero the region defined by the outline of said rear side when the primary rib touches the ground and the envelope drawn by the primary rib when leaving the ground, and further is provided with a plurality of secondary projections for preventing said endless track belt from slipping in the direction opposite to that in which the tracklaying vehicle travels.

2. An endless track belt according to claim 1, wherein said plurality of secondary projections are formed into secondary ribs arranged parallel to each other at a prescribed space along the length of the primary rib.

3. An endless track belt according to claim 1, wherein the backside of the primary rib is shaped substantially like the envelope.

4. An endless track belt according to claim 1, wherein the backside of the primary rib is formed with a flat surface and inclined at an angle of 30° to 50° to the outer surface of the endless belt.

5. An endless track belt according to claim 1, wherein the front side of the primary rib as viewed from the running direction of the track-laying vehicle is inclined more sharply relative to the outer surface of the endless track belt than the backside of said primary rib.

6. An endless track belt according to claim 4, wherein the front side of the primary rib as viewed from the running direction of the track-laying vehicle is made symmetrical with the backside of said primary rib relative to a normal perpendicular to the outer surface of the endless track belt and is further provided with a plurality of the secondary ribs.

7. An endless track belt according to claim 1, wherein the endless track belt itself has its outer surface provided with a plurality of the secondary ribs.

8. An endless track belt according to claim 1, wherein the endless track belt itself has its outer surface provided with a plurality of the secondary ribs.

* * * * *

UNITED STATES PATENT OFFICE
CERTIFICATE OF CORRECTION

Patent No. 3,830,551    Dated August 20, 1974

Inventor(s) Yutaka Masaoka et al

It is certified that error appears in the above-identified patent and that said Letters Patent are hereby corrected as shown below:

Column 5, line 5, change "tracklaying" to --track-laying--.
Column 6, line 15, change "1" to --4--.

Signed and sealed this 19th day of November 1974.

(SEAL)
Attest:

McCOY M. GIBSON JR.
Attesting Officer

C. MARSHALL DANN
Commissioner of Patents